United States Patent
Lindquist et al.

(10) Patent No.: US 6,247,914 B1
(45) Date of Patent: Jun. 19, 2001

(54) CASING MATERIAL AND A METHOD AND APPARATUS FOR ITS MANUFACTURE

(75) Inventors: Bengt Lindquist, Lerum; Stefan Areskoug, Mölnlycke; Anders Strålin, Torslanda, all of (SE)

(73) Assignee: SCA Hygiene Products AB, Gothenburg (SE)

( * ) Notice: Subject to any disclaimer, the term of this patent is extended or adjusted under 35 U.S.C. 154(b) by 0 days.

(21) Appl. No.: 08/849,837

(22) PCT Filed: Dec. 28, 1995

(86) PCT No.: PCT/SE95/01594

§ 371 Date: Jun. 30, 1997

§ 102(e) Date: Jun. 30, 1997

(87) PCT Pub. No.: WO96/20673

PCT Pub. Date: Jul. 11, 1996

(30) Foreign Application Priority Data

Dec. 30, 1994 (SE) .................................................. 9404579

(51) Int. Cl.[7] .............................. B28B 59/04; B29C 11/12
(52) U.S. Cl. ........................ 425/294; 428/132; 428/133; 425/80.1; 425/81.1; 425/82.1; 425/83.1; 425/294; 425/298; 425/304; 425/362; 425/363; 493/365; 493/370; 264/145; 264/146; 264/154; 264/155; 264/156; 264/284; 604/385.01
(58) Field of Search ..................................... 428/132, 133; 425/80.1, 81.1, 82.1, 83.1, 294, 298, 304, 362, 363; 264/145, 146, 154, 155, 156, 284; 604/385.01; 493/365, 370

(56) References Cited

U.S. PATENT DOCUMENTS

| | | | |
|---|---|---|---|
| 3,868,205 | * | 2/1975 | Thomas ................................ 425/363 |
| 3,911,187 | * | 10/1975 | Raley .................................... 428/180 |
| 4,626,254 | * | 12/1986 | Widlund et al. ...................... 604/383 |
| 4,629,643 | * | 12/1986 | Curro et al. .......................... 428/131 |
| 4,778,644 | * | 10/1988 | Curro et al. .......................... 264/557 |
| 5,352,108 | * | 10/1994 | Kagawa et al. .................... 425/174.4 |
| 5,723,087 | * | 3/1998 | Chapell et al. ....................... 264/284 |

FOREIGN PATENT DOCUMENTS

| | | |
|---|---|---|
| 0 195 113A2 | 9/1986 | (EP) . |
| 0 301 599 A2 | 2/1989 | (EP) . |
| 7-178697 | 7/1995 | (JP) . |
| 176551 | 4/1995 | (PL) . |

* cited by examiner

Primary Examiner—William P. Watkins, III
(74) Attorney, Agent, or Firm—Burns, Doane, Swecker & Mathis, L.L.P.

(57) ABSTRACT

The invention relates to a method and to an apparatus for perforating a web of material intended to form an outer casing sheet of absorbent articles. As the web is advanced, the web is first provided with a large number of mutually separated cuts in the nip defined between raised plateaus on a matrix cylinder and circumferentially extending knife-edges of a cutting cylinder. The web is then deformed transversely to its plane at parts which border on each cut. The invention also relates to a perforated outer casing sheet which includes recesses in the form of mutually adjacent elongated channel-like grooves.

14 Claims, 3 Drawing Sheets

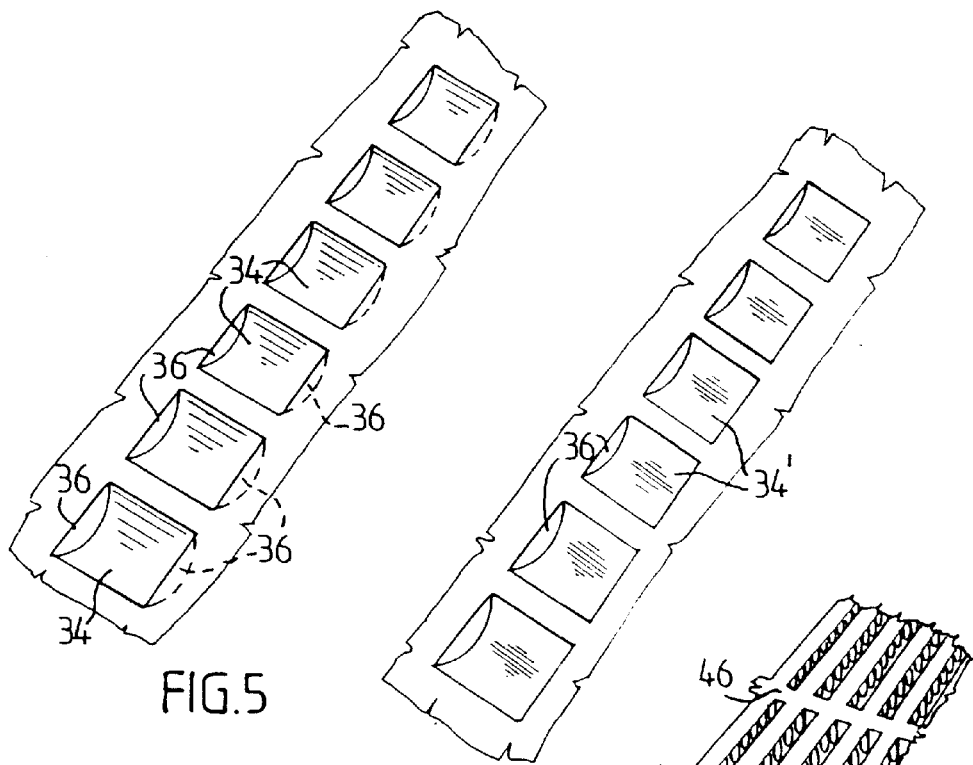
FIG.5
FIG.6
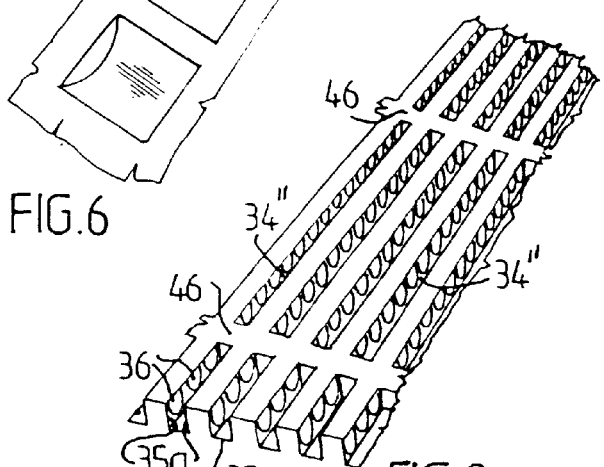
FIG.8
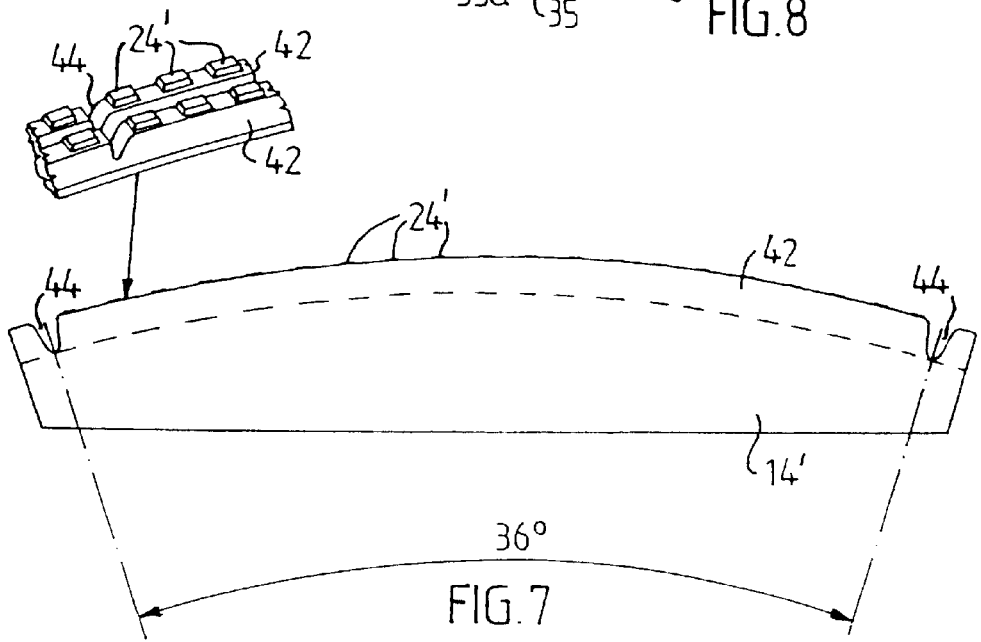
FIG.7

CASING MATERIAL AND A METHOD AND APPARATUS FOR ITS MANUFACTURE

The present invention relates to a method for perforating a web of material intended for use as a casing sheet in the manufacture of absorbent articles, particularly a casing sheet which is intended to lie proximal to the wearer when using the articles, for instance sanitary napkins, diapers and like articles.

The inner perforated casing sheet of absorbent articles normally includes a liquid-impermeable material, such ;as plastic film, wherein the holes formed by the perforations are present in very large numbers so as to enable liquid, or fluid, to flow satisfactorily into the absorbent body of the article that lies inwardly of the casing sheet.

In the case of outer casing sheets of this kind it is also desirable to obtain a relatively small area of contact of the casing sheet with the wearer's body, so as to produce an inner casing sheet which will be felt to be more airy, drier and less plastic-like by the wearer. This is achieved by forming recesses in the web from which the casing sheet is produced, wherein the holes are preferably orientated in planes which lie generally perpendicular to the plane of the outer sheet. Providing that the casing sheet is comprised of opaque material, this orientation of the holes will also afford the advantage that the body liquid absorbed by the absorption body will be less visible.

SE-B-44 9 298 (corresponding to U.S. Pat. No. 4,626, 254) describes and illustrates an inner casing sheet for absorbent articles in which perforated recesses are formed in the casing sheet, wherein the recesses include openings or holes which are orientated in planes that lie generally perpendicular to the plane of the sheet.

These recesses which include holes that lie perpendicular to the plane of the sheet have been formed with the aid of vacuum-forming against a rotating, hollow matrix cylinder, wherein the plastic film is pressed into hollows in the matrix cylinder by the action of hot air and sub-pressure. However, it has been found difficult to obtain controlled and uniform shaping and orientation of the recesses and the holes formed therein simultaneously with the shaping process when practicing the aforesaid method.

Consequently, one object of the present invention is to provide a method for perforating a casing sheet web which will enable the recesses and the holes provided therein to be controlled and forcibly given a more well-defined shape.

This object is achieved with a method according to the invention by first making a large number of discrete cuts in the web as the web is advanced through the nip defined between raised plateaus on a matrix cylinder and knife-edges on a cutting cylinder, and thereafter deforming the web transversely to its plane at parts bordering on each cut, with the aid of a press cylinder which presses the web into hollows in the matrix cylinder such as to create perforated recesses in the web.

The invention also relates to apparatus for carrying out the method, said apparatus being characterized in that it includes a matrix cylinder which has a large number of circumferentially extending rows of mutually separated, raised plateaus, a cutting cylinder which has circumferentially extending knife-edges which are intended to generally touch respective plateaus on the matrix cylinder so as to cut intermittently, the web advanced through the nip defined by the knife-edges and the plateaus, and a press cylinder which is mounted downstream of the cutting cylinder and which has circumferentially extending ribs which are configured to engage in circumferentially extending grooves between rows of plateaus on the matrix cylinder, such as to form in the web recesses which include holes that are orientated in a plane which lies generally perpendicular to the plane of the web.

The present invention also relates to a perforated outer casing sheet, particularly the inner casing sheet of absorbent articles, such as sanitary napkin, diapers or like articles, wherein the casing sheet includes a large number of perforated recesses in which the holes or perforations are orientated in a plane which lies generally perpendicular to the plane of the casing sheet. According to the invention, the recesses are mainly characterized in that they are formed by mutually adjacent, elongated channel-like grooves.. This enables the whole area per unit of surface area to be increased and the contact area with the wearer's body to be reduced, while enabling the elastic properties of the outer casing sheet to be influenced transversely to the grooves as desired.

Suitable embodiments of the inventive method and the inventive apparatus and also further features thereof will be described in more detail below with reference to the accompanying drawings in which FIG. 1 is a schematic perspective view of inventive apparatus for perforating a web of material, and also shows fragmentary partially enlarged views of the main components of the apparatus and of the perforated web;

FIG. 5 is a fragmentary view of a row of perforated recesses of a "hammock-like" configuration, produced by means of the apparatus according to the FIG. 1 embodiment;

FIG. 6 illustrates a row of perforated recesses of "eyebrow-like" configuration, produced by means of a matrix cylinder having pegs according to the FIG. 4 embodiment;

FIG. 7 illustrates a sector-shaped mantle part and a fragmented part of ribs of a modified embodiment of the matrix cylinder;

FIG. 8 illustrates elongated channel-like or groove-like recesses in the web, formed by a matrix cylinder in accordance with FIG. 7.

Figure 1A:
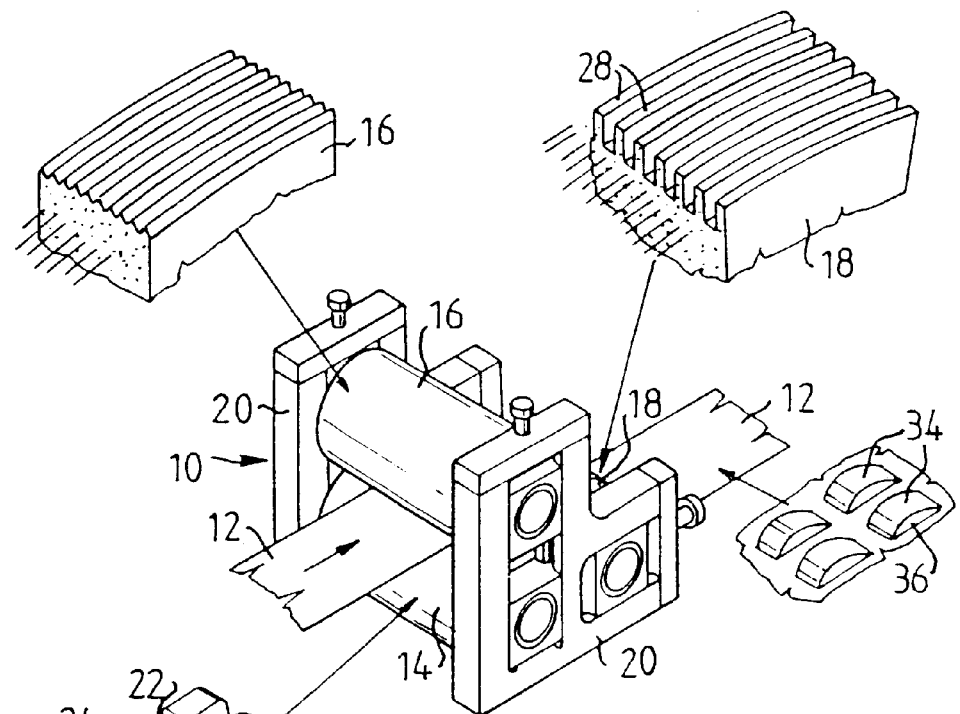
FIG. 1a is a fragmentary perspective view of alternative positioning of the cog-like pegs on the matrix cylinder.
Figure 1A:
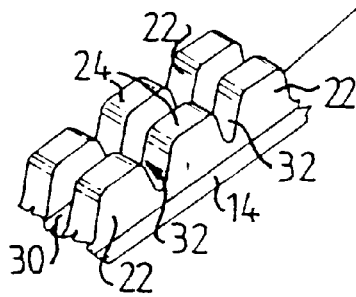

FIG. 1 illustrates inventive apparatus, generally referenced 10, for producing perforated recesses in a web of material 12 which is intended to form an outer casing sheet for absorbent articles such as sanitary napkins, diapers and like articles, and more specifically to form the liquid-permeable inner casing sheet that lies proximal to the wearer's body in use. The web 12 may consist, for instance, of plastic film or may be comprised of a plastic film/nonwoven laminate, wherein in the latter case the plastic sheet will form the surface that is in contact with the wearer of the article.

Figure 2:
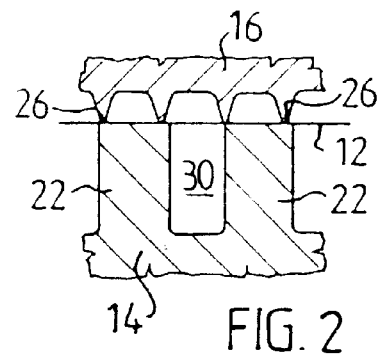
FIG. 2 is a fragmentary cross-sectional view which illustrates cutting of a web in a nip defined between a matrix cylinder and a cutting cylinder.

In principle the apparatus 10 is comprised of a matrix cylinder 14, a cutting cylinder 16 and a press cylinder 18. These cylinders are journalled for rotation in a stand 20 and can be adjusted in relation to one another for adequate mutual abutment and engagement. According to the embodiment illustrated in FIGS. 1–3, the matrix cylinder 14 includes a large number of circumferentially extending and axially separated rows of generally cog-like pegs 22 which have curved top surfaces that form raised plateaus 24 against which the knife-edges 26 of the cutting cylinder 16 are intended to abut or generally touch, so that as the web 12 is advanced through the nip defined between matrix cylinder and cutting cylinder 14 and 16 respectively there will be formed in the longitudinal direction of the web a large number of mutually separated cuts, as shown more clearly in FIG. 2. In this case, the knife-edges 26 on the cutting cylinder 16 are intended to cut the web 12 at side-edge parts of the plateaus 24 of the pegs 22 and accordingly have twice the number of edges 26 as the number of rows of pegs 22.

FIG. 1a illustrates a modified embodiment of the matrix cylinder 14, wherein the pegs 22 of mutually adjacent rows of pegs are offset mutually in the peripheral or row direction, thereby enabling the elasticity to be varied appropriately transversely to the finished imprinted web, as desired.

Figure 3:
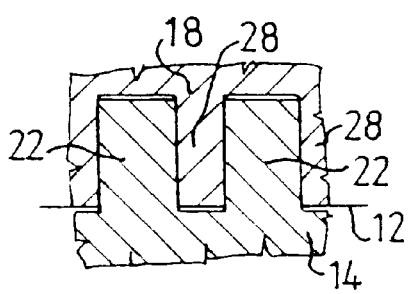
FIG. 3 is a fragmentary cross-sectional view which shows the engagement between the matrix cylinder and a press cylinder, wherein the plane of the web is displaced and perforated recesses are formed by plastic deformation of the web across pegs on the matrix cylinder.

The press cylinder 18 has a large number of circumferentially extending press ribs 28 which are configured and arranged to engage in the circumferentially extending grooves 30 located between the rows of pegs 22 on the matrix cylinder 14. As shown in FIG. 3, the press ribs 28 move the web 12 inwardly against the bottom of the grooves 30 and the spaces 32 between the pegs 22, therewith deforming the web 12 plastically on one side of each cut in the web, such that hammock-like recesses 34 (FIGS. 1 and 5) are formed across the pegs 22 with opposing hole openings 36 orientated essentially in a plane which extends perpendicular to the plane of the web 12.

Figure 4:
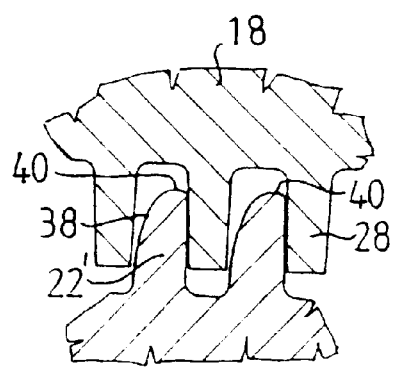
FIG. 4 illustrates an alternative embodiment of the pegs; on the matrix cylinder in engagement with ribs on the press cylinder.

FIG. 4 illustrates an alternative embodiment of the matrix pegs 22', where one side wall 38 of respective pegs has a convex curved shape—seen in an axial cross-section through the matrix cylinder—to form a ridge-like formation 40 on the opposite side edge of the peg 22'. Thus, when cutting the web 12 with the aid of a cutting cylinder of this configuration one knife-edge 26 is omitted for each peg 22'. The recesses 34' formed in the web by said subsequent pressing of the ribs 28 on the press cylinder 18 into the grooves 30 defined between the rows of pegs therewith obtain an eye-brow like shape (FIG. 6) having solely one hole opening 36 orientated generally perpendicular to the web 12. Although a recess 34' of this configuration will result in a smaller total hole area of the web, there is achieved, on the other hand, much better shape stability of the recesses.

Figure 9:
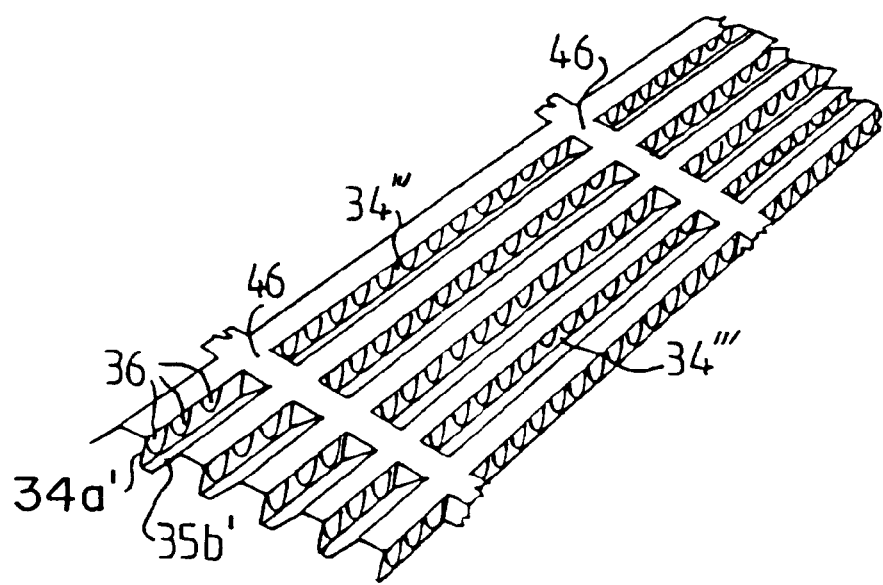
FIG. 9 illustrates elongated channel-like or groove-like recesses in a web, formed by a matrix cylinder similar to that shown in FIG. 7 but with press ribs that have a cross-sectional shape corresponding to the cross-sectional shape of the pegs shown in FIG. 4.

FIG. 7 illustrates part of a further embodiment of an inventive matrix cylinder 14'. Distinct from the pegs 22, 22' of the embodiment illustrated in FIGS. 1–4, this matrix cylinder has circumferentially extending ribs 42 which have a configuration corresponding to the configuration of the pegs 22 shown in FIG. 3, when seen in an axial cross-section through the cylinder. The ribs 42 have arranged along their cylindrical mantle surfaces a plurality of raised plateaus 24' which are mutually separated circumferentially and which correspond to the tops of the pegs 22. However, the mutually adjacent plateaus 24' are not separated circumferentially by cog-like interspaces, as are the pegs 22. Thus, those recesses that are formed on the web as the press roll 18 engages the matrix cylinder 14' obtain an elongated, channel-like or groove-like configuration 34" with an increased hole area and reduced user body contact surface, as shown in FIG. 8. The grooves 34" are delimited by two opposing side walls 35a in which the holes 36 are formed, and a bottom wall 35b. The groove configuration of the recesses 34''' shown in FIG. 9 is obtained when the matrix ribs 42 have a cross-sectional shape corresponding to the cross-sectional shape of the pegs 22' shown in FIG. 4. In this case, the grooves 34''' are delimited by a side wall 34a' and a sloping bottom wall 35b'.

The matrix cylinder 14' may have ribs which extend continuously around the cylinder, or, as shown in FIG. 7, ribs 42 which are broken by cog-like interruptions 44 which give each rib 42 the form of a sector having a plurality of plateaus 24'. FIG. 7 shows one such sector having twenty plateaus 24' and which constitutes one tenth of the periphery of the whole matrix cylinder 14'. As a result of the interruptions 44 in the ribs 42 there is obtained in the perforated and imprinted web transverse web parts 46 (FIGS. 8 and 9) which are able to stabilize the material and to limit the stretch and elasticity of the web in its transverse direction in a suitable manner as desired.

What is claimed is:

1. Apparatus for perforating a web of material intended to form an outer casing sheet of absorbent articles, wherein the apparatus includes a rotatable matrix cylinder which has a plurality of circumferentially extending rows of mutually spaced raised plateaus; a rotatable cutting cylinder which includes circumferentially extending knife-edges which are intended and arranged to touch respective plateaus on the matrix cylinder, so as to intermittently cut the web as it moves through a nip defined between the knife-edges and the plateaus; and a rotatable press cylinder which is mounted downstream of the cutting cylinder and which includes circumferentially extending ribs which are configured and arranged to engage in circumferentially extending grooves in the machine direction of the web, located between the rows of plateaus on the matrix cylinder so as to form in the web recesses in the machine direction of the web, which have holes orientated only in a plane which lies generally perpendicular to the plane of the web.

2. Apparatus according to claim 1, wherein the raised plateaus are formed on the tops of generally cog-shaped pegs.

3. Apparatus according to claim 2, wherein the plateaus are formed by a ridge-shaped formation along one side edge of a peripheral surface of the pegs.

4. Apparatus according to claim 3, wherein one side of each peg has a convex curved shape when seen in an axial cross-section through the matrix cylinder.

5. Apparatus according to claim 4, wherein the other side of each peg is orientated generally radially.

6. Apparatus according to claim 1, wherein the plateaus have the form of raised portions on circumferentially extending ribs on the matrix cylinder.

7. Apparatus according to claim 6, wherein both sides of each rib are orientated generally radially, seen in an axial cross-section through the matrix cylinder.

8. Apparatus according to claim 6, wherein one side of each rib has a convex curved shape, seen in an axial cross-section through the matrix cylinder.

9. Apparatus according to claim 6, wherein the circumferentially extending ribs having raised portions include a plurality of interruptions which are mutually separated circumferentially and which have the form of hollows, thereby forming between two mutually adjacent hollows in the circumferential direction a plateau row sector which includes a plurality of raised portions.

10. Apparatus according to claim 2, wherein the cutting cylinder has continuously circular knife-edges whose number is twice that of the number of rows of plateaus on the matrix cylinder, and wherein each knife-edge generally touches one side-edge part of each plateau.

11. Apparatus according to claim 3, wherein the cutting cylinder has continuously circular knife-edges whose number corresponds to the number of rows of plateaus on the matrix cylinder.

12. Apparatus according to claim 1, wherein the number of ribs on the press cylinder is one more than the number of rows of plateaus on the matrix cylinder.

13. Apparatus according to claim 1, wherein the cylinders are journalled in a common stand.

14. Apparatus according to claim 1, wherein the matrix cylinder is fixedly journalled whereas the cutting cylinder and the press cylinder are journalled so as to enable said cylinders to be adjusted radially in relation to the matrix-cylinder in the stand.

* * * * *